B. FITTS.
PACKING PUMP JOINTS.
No. 65,803.
Patented Jan. 18, 1867.
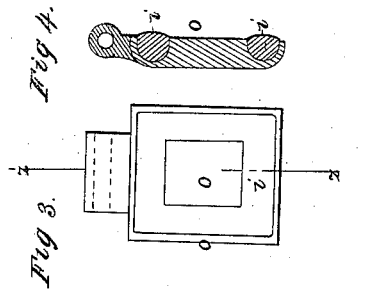
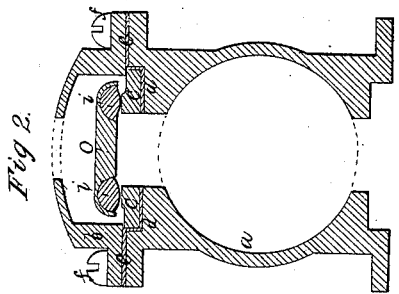
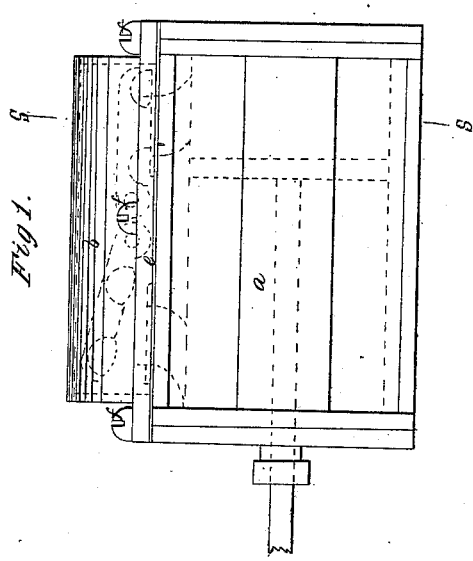
Inventor.
Benaiah Fitts

United States Patent Office.

BENAIAH FITTS, OF NEWARK, NEW JERSEY.

Letters Patent No. 65,803, dated June 18, 1867.

IMPROVEMENT IN PACKING PUMP-JOINTS.

*The Schedule referred to in these Letters Patent and making part of the same.*

TO ALL WHOM IT MAY CONCERN:

Be it known that I, BENAIAH FITTS, of Newark, county of Essex, State of New Jersey, have invented a new and useful Improvement in Packing of Joints for Pumps and other purposes; and I do hereby declare that the following is a full, clear, and exact description of the construction and operation of the same, reference being had to the annexed drawing making a part of this specification.

The invention relates to improvements in packing the joints betwixt metal surfaces by the use of India rubber or other similar substance; the rubber being first prepared and placed upon the surface of the metal, or in grooves or recesses made for the purpose, in a plastic state, and then pressed down to the desired thickness and vulcanized The drawings are designed to represent a pump, with its joints packed, as herein described.

Figure 1 is an elevation of the pump.

Figure 2 is a section, through $s\ s$, fig. 1, showing the packing betwixt the joints, also a valve and valve-seat, with their rubber packings.

Figure 3 is to show the face of a valve with its rubber packing or facing.

Figure 4 is a section through $x\ x$, fig. 3—

The same letters referring to like parts in all.

The construction is as follows: $a$ is a force-pump cylinder, made of iron or other metal in the usual form. $b$ is a cap, placed over the valves, forming the valve-box, and has to be removed to get access to the valves. $c\ c$ is a valve-seat made of brass or other metal, and is held in its place by cap $b$ resting upon it, as shown. $f\ f$ are screws that hold the cap $b$ and valve-seat $c\ c$ in place. $d\ d$ are packings, betwixt valve-seat $c\ c$ and cylinder $a$. $e\ e$ are packings betwixt cap $b$ and cylinder $a$. These packings are of India rubber, and formed in a peculiar manner, hereafter described. Figs. 3 and 4 is a valve. It is also shown at $g$, fig. 2, and is made by forming a metallic case, and filling it with India rubber in a plastic state, and then vulcanizing in $o$, being the metallic case, and $i$ the rubber.

The operation of packing the pump is as follows: No care need be taken to true off or straighten the surfaces under the packings $e\ e$ and $f\ f$, but they should be clean and free from oil or dust, so that the rubber will adhere firmly to the metal. The rubber is then mixed and prepared as for packing, and, while in the plastic state, laid on to the cylinder in sufficient quantity to fill up all the inequality of the surfaces and form a packing. The surface of the rubber is then covered over with a coating of finely pulverized soapstone, so as to prevent it adhering to the valve-seat $c\ c$ or cap $b$. The valve-seat is then put on, and then the cap, and drawn down to the desired position by screws $f\ f$; the cap drawing down and holding in place the valve-seat, and all rubber that is not required to form the packing and make the joint is forced out. The pump is then placed in an oven or otherwise heated to the required temperature, and there remains until the rubber has become vulcanized. It will then be seen on removing the cap and valve-seat that the rubber has firmly adhered to the pump-cylinder, while the cap and valve-seat can be taken off or put on at pleasure, and all the inequalities of the metal are filled up with rubber, insuring a tight joint, and as the rubber cannot be moved in its position or taken off, (however often it may be necessary to take off the cap or valve-seat,) the packing remains the same, and always securing a tight joint. The valve, figs. 3 and 4, is constructed in a similar manner, a metallic case, $o$, being formed with its hinge or guide, with the outside edge corresponding with the outside of the valve-seat. Grooves or recesses are formed over the valve-seat in the metallic case $o$, as shown. The grooves are then filled with rubber in the plastic state, pressed down with a die having a concave face, and vulcanized. The rubber thus becomes firmly attached to the metallic case, forming an elastic convex surface to come in contact with the valve-seat, as shown at $i\ i$; or, if desired, a flat die may be used, thus leaving a flat surface.

I do not claim broadly vulcanizing rubber upon the surface of a metal, for this is done in coating pipes and other manufactured articles. Neither do I claim vulcanizing rubber between plates or forms of metal, for this is a well-known process in moulding. But what I claim as new, and desire to secure by Letters Patent, is—

1. The packing composed of India rubber or other similar substance, formed or constructed substantially as set forth and described; that is to say, a packing made by applying the prepared India rubber in the plastic state to the different surfaces, as shown, and compressing it to fit all the inequalities, recesses, or grooves in the metal, and being made, in vulcanizing, to adhere firmly to one part of the metal, leaving the other to be freely removed.

2. I claim a pump-valve, composed of a metallic case, in which is confined India rubber adhering to the metal, by being vulcanized therein, and forming an elastic face, as described.

BENAIAH FITTS.

Witnesses:
J. E. HENNEPIN,
C. HALSEY CANFIELD